(12) United States Patent
Kokura

(10) Patent No.: US 9,958,604 B2
(45) Date of Patent: May 1, 2018

(54) OPTICAL FIBER, AND OPTICAL-FIBER PRODUCTION METHOD

(71) Applicant: FURUKAWA ELECTRIC CO., LTD., Tokyo (JP)

(72) Inventor: Kunio Kokura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/513,911

(22) PCT Filed: Sep. 24, 2015

(86) PCT No.: PCT/JP2015/076883
§ 371 (c)(1),
(2) Date: Mar. 23, 2017

(87) PCT Pub. No.: WO2016/047669
PCT Pub. Date: Mar. 31, 2016

(65) Prior Publication Data
US 2017/0285258 A1 Oct. 5, 2017

(30) Foreign Application Priority Data
Sep. 24, 2014 (JP) .................................. 2014-193569

(51) Int. Cl.
*G02B 6/02* (2006.01)
*G02B 6/024* (2006.01)
*G02B 6/44* (2006.01)

(52) U.S. Cl.
CPC ......... *G02B 6/02042* (2013.01); *G02B 6/024* (2013.01); *G02B 6/4404* (2013.01); *G02B 6/448* (2013.01); *G02B 6/4482* (2013.01)

(58) Field of Classification Search
None
See application file for complete search history.

(56) References Cited

U.S. PATENT DOCUMENTS

2015/0055923 A1 2/2015 Saito et al.
2016/0223774 A1* 8/2016 Bennett ................ G02B 6/4482

FOREIGN PATENT DOCUMENTS

JP 58-13505 U * 1/1983
JP S58-13505 1/1983
(Continued)

OTHER PUBLICATIONS

International Search Report issued in PCT/JP2015/076883 dated Nov. 2, 2015.
(Continued)

*Primary Examiner* — Michelle R Connelly
(74) *Attorney, Agent, or Firm* — Marshall, Gerstein & Borun LLP

(57) ABSTRACT

In this multi-core fiber, a plurality of cores are arranged at a prescribed interval, and the peripheries thereof are covered by a cladding having a lower refractive index than the plurality of cores. A resin coating is formed on the outer periphery of the cladding. A colored section is formed on a section of the outer surface of the resin coating in the peripheral direction. The colored section is formed continuously along the length direction of the multi-core fiber. In a multi-core fiber cross section orthogonal to the length direction, the position of a specific core and the peripheral position where the colored section is formed are substantially constant along the length direction of the multi-core fiber. In other words, in the multi-core fiber cross section orthogonal to the length direction, the position of the specific core and the position where the colored section is formed are substantially constant along the length direction of the multi-core fiber.

6 Claims, 11 Drawing Sheets

(56) References Cited

FOREIGN PATENT DOCUMENTS

| JP | S58-105503 | 7/1983 |
| JP | S60213904 | 10/1985 |
| JP | H01-279210 A | 11/1989 |
| JP | 2011-170099 A | 9/2011 |
| JP | 2013-33865 A | 2/2013 |
| JP | 2013-50695 A | 3/2013 |

OTHER PUBLICATIONS

Written Opinion issued in PCT/JP2015/076883 dated Nov. 2, 2015.
Decision to Grant a Patent issued in Japanese Patent Application No. 2016-512142 dated Oct. 13, 2016.
Office Action issued in Japanese Patent Application No. 2016-512142 dated Jun. 30, 2016.

* cited by examiner

OPTICAL FIBER, AND OPTICAL-FIBER PRODUCTION METHOD

TECHNICAL FIELD

This disclosure relates to an optical fiber and the like.

BACKGROUND

Due to rapidly increasing traffic in optical communications in recent years, the transmission capacity of presently used single-core optical fibers is approaching its limit. So, as a means to further expand the communication capacity, multicore fibers in which a plurality of cores are formed in one fiber have been proposed. Use of multi-core fibers can suppress the laying cost of optical fibers and expand the transmission capacity.

When a multi-core fiber is used as a transmission path, each of the core parts of the multicore fiber needs to be connected to another multi-core fiber, an optical element, or the like respectively to send and/or receive transmission signals.

On the other hand, a multi-core fiber has cores arranged at positions other than the center of the cross section, and this leads to a problem that the connection thereof is more difficult compared to connection of single-core fibers.

When connecting such multi-core fibers, it is preferable that the arrangements of the cores of the multi-core fibers can be easily identified.

As such a multi-core fiber, the prior art (e.g., JP A 2011-170099) discloses a multi-core fiber provided with a marker on a cladding thereof for identifying core arrangements.

Moreover, besides multi-core fibers, when compared with connections of commonly used single-core optical fibers, it is still difficult as in the case of multi-core fibers to connect optical fibers in which a form of a cross section of the optical fiber taken in a perpendicular direction to a longitudinal direction thereof has an orientation in a rotational direction with the longitudinal direction of the optical fiber as an axis (such as eccentric core fibers or polarization-maintaining fibers).

However, with the method disclosed in JP A 2011-170099 in which a marker with different refractive index is provided inside the cladding cross section, it is impossible to identify the core arrangement unless the cross section is cut or a resin coating of side surface of the cladding is removed and the position of the marker is observed under a microscope. Thus, it is difficult to easily identify the core arrangement from appearance.

SUMMARY OF THE DISCLOSURE

The presently described embodiments were achieved in view of such problems. Its object is to provide an optical fiber of which the core arrangement can be easily identified from an outer surface of a resin coating thereof, and the like.

To achieve the above object, a first embodiment is an optical fiber including a core, a cladding that is formed on a periphery of the core and has a refractive index lower than that of the core, a resin coating that is formed on a periphery of the cladding, and a colored portion that is provided on a part of an outer surface of the resin coating in a circumferential direction thereof. A form of a cross section of the optical fiber taken in a perpendicular direction to a longitudinal direction thereof has an orientation in a rotational direction with the longitudinal direction of the optical fiber as an axis. The colored portion is provided in such a manner that a positional relation between a position of the colored portion and a position of the core is substantially uniform over the longitudinal direction on a cross section of the optical fiber taken in a perpendicular direction to the longitudinal direction thereof.

Preferably, the colored portion is formed continuously or intermittently over an entire length of the optical fiber in the longitudinal direction thereof.

The optical fiber may be a multi-core fiber including a plurality of cores, and the colored portion may be provided in such a manner that a positional relation between a position of the colored portion and a position of a particular core, which is one of a plurality of the cores, is substantially uniform over the longitudinal direction on a cross section of the multi-core fiber taken in a perpendicular direction to the longitudinal direction thereof.

The particular core may be an outermost core that is disposed at a position closest to the outer surface of the cladding on a cross section of the multi-core fiber taken in a perpendicular direction to the longitudinal direction thereof, and the colored portion may be formed at a position closest to the particular core.

A plurality of cores may be disposed so as to have symmetry on a cross section of the multi-core fiber taken in a perpendicular direction to the longitudinal direction thereof, and the colored portion may be formed at a position that is shifted from any of the symmetric axes.

The colored portion may be formed on at least two locations on a cross section of the multi-core fiber taken in a perpendicular direction to the longitudinal direction thereof.

According to the first embodiment, a colored portion is formed on a resin coating and the positional relation between the position of the colored portion in a circumferential direction and the position of the particular core on a cross section of the optical fiber taken in a perpendicular direction to the longitudinal direction thereof is substantially uniform. Thus, the core arrangement of the optical fiber can be grasped from its appearance. Thus, rotational alignment of the optical fiber is easy.

In particular, if the colored portion is formed over an entire length of the optical fiber, the positional relation between the colored portion and the core is always the same at any cross sections.

Also, a multi-core fiber is applicable as an optical fiber of the presently described embodiments, for example. Also, on a cross section of the multi-core fiber taken in a perpendicular direction to the longitudinal direction thereof, if the colored portion is formed at a position in the circumferential direction being closest to the outermost core which is closest to the outer periphery, then it is easy to grasp the position of the colored portion and the position of the particular core.

Also, on a cross section of the multi-core fiber taken in a perpendicular direction to the longitudinal direction thereof, if a plurality of cores are disposed line-symmetrically with a centerline of the cross section as an axis of symmetry and the colored portion is formed at a position shifted from any of the symmetric axes, then it is possible to identify between the end parts of the multi-core fiber.

The end parts of the multi-core fiber can also be identified by forming the colored portions on at least two locations so that each of the colored portions is formed on a different centerline of a cross section of the multi-core fiber taken in a perpendicular direction to the longitudinal direction thereof. In this way, the connection direction of the multi-core fiber will not be mistaken.

A second embodiment is a method of producing an optical fiber including a core, a cladding that is formed on a periphery of the core and has a refractive index lower than that of the core, a resin coating that is formed on a periphery of the cladding, and a colored portion that is provided on a part of an outer surface of the resin coating in a circumferential direction thereof. The method includes a light introducing step which introduces light into the core of the fiber, a light leaking step which leaks the light introduced into the core outside the optical fiber, a light detecting step which detects the light leaked in the light leaking step, an optical-fiber rotating step which rotates the optical fiber in a circumferential direction thereof so as to maintain the leaked light detected in the light detecting step to be substantially constant, and a resin applying step which applies a colored resin on a part of an outer surface of the resin coating in a circumferential direction thereof so that a positional relation between a position of the colored resin and a position of the core is substantially uniform over the longitudinal direction on a cross section perpendicular to the longitudinal direction of the optical fiber.

The optical fiber may be a multi-core fiber including a plurality of cores, and, in the resin applying step, the colored portion may be applied to a part of the outer surface of the resin coating in the circumferential direction in such a manner that a positional relation between a position of the colored portion and a position of a particular core, which is one of a plurality of the cores, is substantially uniform over the longitudinal direction on a cross section of the multi-core fiber perpendicular to the longitudinal direction.

In the light introducing step, light may be introduced from a bent portion of the bent optical fiber.

In the light introducing step, light may be introduced from an end of the optical fiber.

The optical-fiber rotating step may rotate the optical fiber in its circumferential direction by tilting a rotational surface of a bobbin that winds up the optical fiber or a bobbin that reels out the optical fiber.

The optical-fiber rotating step may rotate the optical fiber in its circumferential direction by tilting a rotational surface of a roller which is disposed either in front or rear of a detector that detects leak of light in the light detecting step.

According to the second embodiment, a colored portion can be formed over an entire length of the longitudinal direction so that its positional relation with the particular core of the multi-core fiber is substantially uniform.

Also, if the light introducing part is a bent portion, light can be introduced into the multi-core fiber in the proximity of the optical detector.

Also, if the light introducing part is an end part of the multi-core fiber, light can be introduced into a selected particular core.

Also, the multi-core fiber can be twisted by rotating a bobbin that winds up or reels out the multi-core fiber with a winding direction or a reeling out direction as an axis of rotation, respectively. Thus, the multi-core fiber is twisted according to the light intensity detected at the optical detector so that the multi-core fiber can be easily controlled to have the particular core at a fixed position.

These effects can also be obtained from rotating a roller that is disposed in front or rear of the optical fiber bending part with a running direction of the multi-core fiber as an axis of rotation.

The present embodiments can provide an optical fiber of which the core arrangement can be easily identified from an outer surface of a resin coating thereof, and the like.

BRIEF DESCRIPTION OF DRAWINGS

FIG. 1b is a drawing showing a multi-core fiber 1a.
FIG. 7b is a cross sectional view showing an optical fiber ribbon 30a.
FIG. 8a is a drawing showing a colored resin applying apparatus 10a.

DETAILED DESCRIPTION

First Embodiment

Figure 1A:
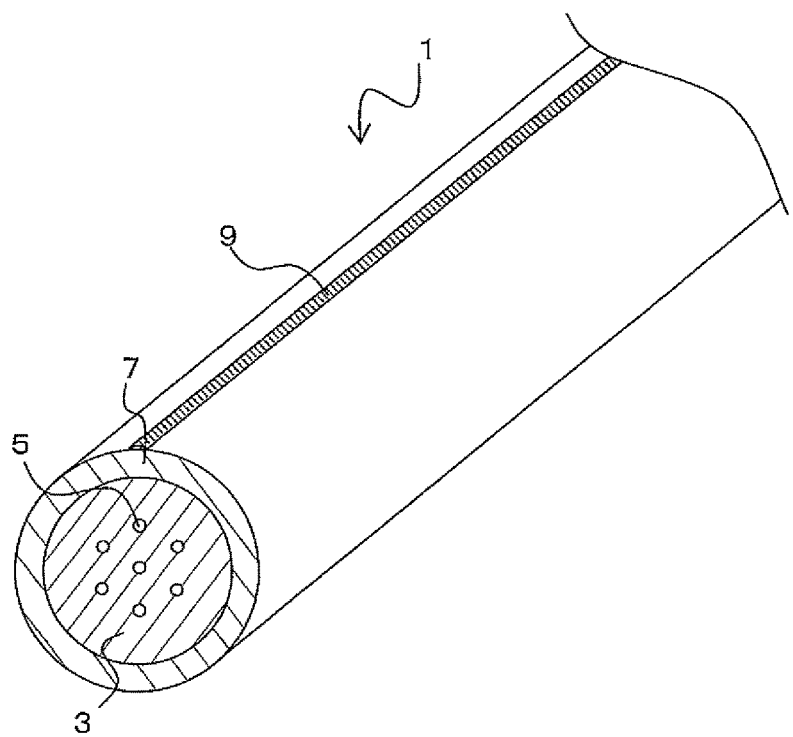
FIG. 1a is a drawing showing a multi-core fiber 1.

Hereinafter, an optical fiber according to an embodiment will be described. FIG. 1a is a schematic view of a multi-core fiber 1, which is an optical fiber.

The multi-core fiber 1 is an optical fiber that has a circular cross section, and includes a plurality of cores 5, which are arranged at predetermined intervals, and a cladding 3, which has a refractive index lower than that of a plurality of the cores and are formed on the periphery of a plurality of the cores. For example, the multi-core fiber 1 has total of the seven cores 5, one of which is disposed at the center of the multi-core fiber 1 with the others surrounding the center core and being disposed at each vertices of a regular hexagon.

That is, the center core 5 and the other surrounding six cores 5 are all at regular intervals. Also, for the six cores 5, the distance between the adjacent cores 5 is the same. The core 5 becomes a waveguide for signal light. The arrangement of the cores 5 is not limited to the example shown in the drawing.

A resin coating 7 is formed on the periphery of the cladding 3. A colored portion 9 is formed on a part of an outer surface of the resin coating 7 in the circumferential direction. The colored portion 9 is formed continuously or intermittently along the longitudinal direction of the multi-core fiber 1. Preferably, the colored portion 9 is formed continuously along the entire length of the multi-core fiber 1, or may be formed over a range of a predetermined length.

A form of a cross section of the multi-core fiber taken in a perpendicular direction to a longitudinal direction thereof has an orientation in a rotational direction with the longitudinal direction of the multi-core fiber as an axis of rotation. Also, on the cross section perpendicular to the longitudinal direction of the multi-core fiber 1, the position of a particular core 5 and the position where the colored portion 9 is formed are substantially uniform over the longitudinal direction of the multi-core fiber 1. That is, this positional relation is maintained at any position (any position within the range in which the colored portion 9 is formed) along the longitudinal direction of the multi-core fiber 1.

For example, the particular core 5 is a core that is disposed at a position closest to the outer surface of the cladding on the cross section perpendicular to the longitudinal direction of the multi-core fiber 1 (hereinafter, an outermost core). In this case, if the colored portion 9 is formed at a position closest to the outermost core (directly above the outermost core), it is possible to visually recognize the position of the particular core 5 easily. That is, the colored portion 9 functions as a marker for recognizing the core position.

Figure 1B:
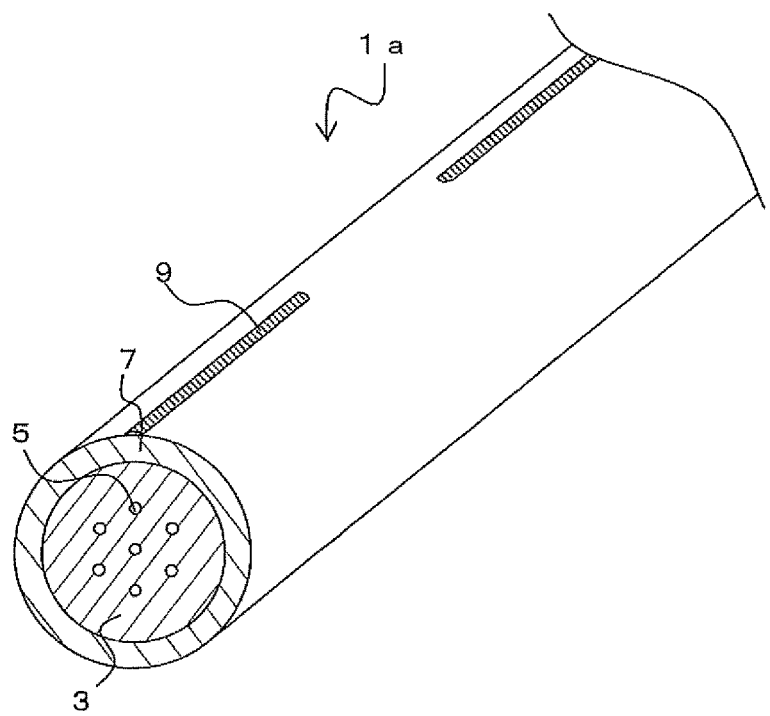

The colored portion 9 may be formed intermittently over the longitudinal direction as in a multi-core fiber 1a shown in FIG. 1(b). Also, in this case, the position of a particular core 5 and the position where the colored portion 9 is formed are substantially fixed over the longitudinal direction of the multi-core fiber 1 on the cross section perpendicular to the longitudinal direction of the multi-core fiber 1 within a range in which the colored portion 9 is formed.

Figure 2:
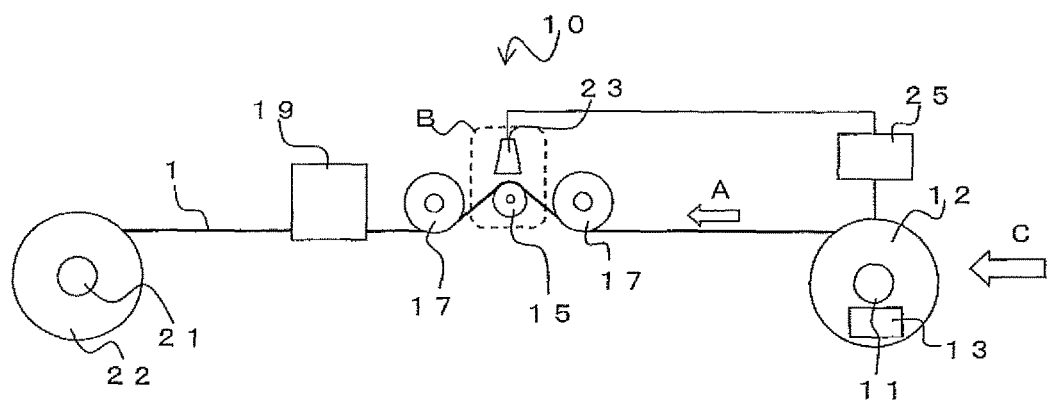
FIG. 2 is a drawing showing a colored resin applying apparatus 10.

Next, a method for producing the multi-core fiber 1 will be described. FIG. 2 is a drawing showing a colored resin applying apparatus 10. The colored resin applying apparatus 10 mainly includes bobbin mounting parts 11 and 21, a bobbin controller 25, guides 17, an optical fiber bending part 15, an optical detector 23, a resin applying part 19, and so on.

The multi-core fiber 1 before coloring is wound around a bobbin 12, which is disposed on the bobbin mounting part 11, and the multi-core fiber 1 is reeled out from the bobbin 12. A light introducing part 13 is provided on the bobbin mounting part 11. The light introducing part 13 is a light source that introduces light into an end part of the multi-core fiber 1. The light introducing part 13 can introduce light into only a particular core as well as into all of the cores.

The multi-core fiber 1 reeled out from the bobbin 12 (an arrow A in the drawing) is sent to the optical fiber bending part 15 disposed between a pair of the guides 17. The optical fiber bending part 15 is a roller and bends the multi-core fiber 1 contacting and passing the roller to have a predetermined curvature. The guides 17 are rollers guiding the multi-core fiber 1 in a running route so that the multi-core fiber 1 contacts the optical fiber bending part 15 for a predetermined range to be bent.

In the proximity of the optical fiber bending part 15, the optical detector 23 is disposed. The optical detector 23 is a sensor that continuously detects light leaked from the multi-core fiber 1. The intensity of the leaked light detected by the optical detector 23 is sent to the bobbin controller 25. The bobbin controller 25 controls the posture of the bobbin 12. The detection of the leaked light by the optical detector 23 and the method of controlling the bobbin 12 thereby will be described later.

The multi-core fiber 1 that has passed the optical fiber bending part 15 then passes through the resin applying part 19. At the resin applying part 19, a colored resin is applied to a predetermined position of the periphery surface of the resin coating 7 of the multi-core fiber 1. The resin applying part 19 can apply the colored resin continuously or intermittently over the entire length of the multi-core fiber 1 by, for example, contacting a roller holding the colored resin with the periphery surface of the multi-core fiber 1. The colored resin may be in any color as long as it is recognizable from the resin coating 7.

The colored resin applied at the resin applying part 19 is then cured by drying or UV radiation, if necessary, to form the colored portion 9. The multi-core fiber 1 formed with the colored portion 9 is wound up by a winding-up bobbin 22 disposed on the bobbin mounting part 21. As above, the multi-core fiber 1 is produced.

Figure 3:
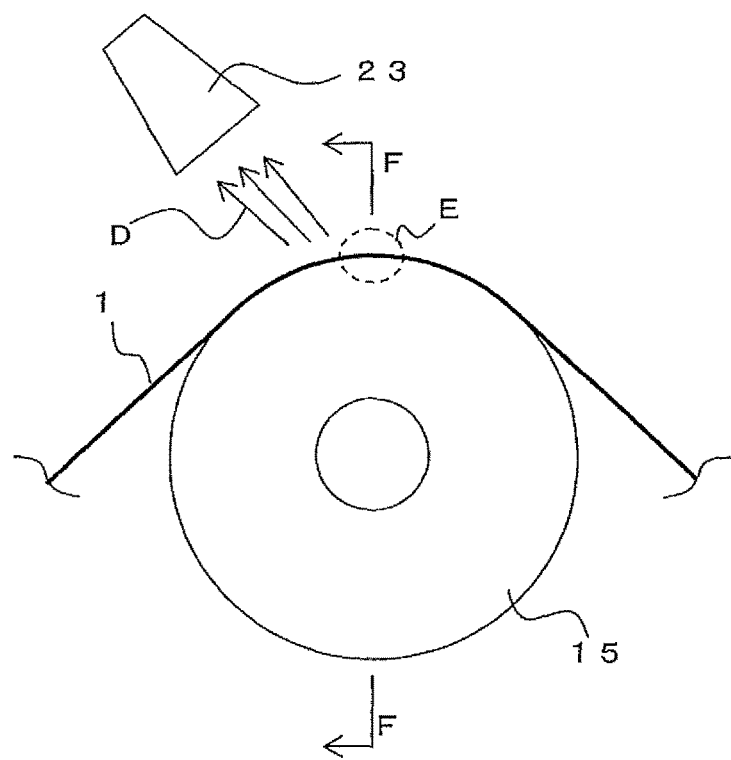
FIG. 3 is a drawing showing the vicinity of an optical detector 23 and is an enlarged view of B section in FIG. 2.

Next, the detection of the leaked light by the optical detector 23 and the method of controlling the bobbin 12 will be described. FIG. 3 is an enlarged view of the vicinity of the optical fiber bending part 15 (an enlarged view of B section in FIG. 2). As mentioned above, the multi-core fiber 1 bends along the optical fiber bending part 15. Also, light is introduced into at least one of the cores 5 of the multi-core fiber 1 by the light introducing part 13 (a light introducing step). Thus, when the multi-core fiber 1 is bent to have a curvature greater than a predetermined curvature, the light introduced into the core 5 leaks outside the multi-core fiber (D in the drawing) according to distortion of the multi-core fiber 1 (a light leaking step). The optical detector 23 detects this leaked light (a light detecting step).

Figure 4A:
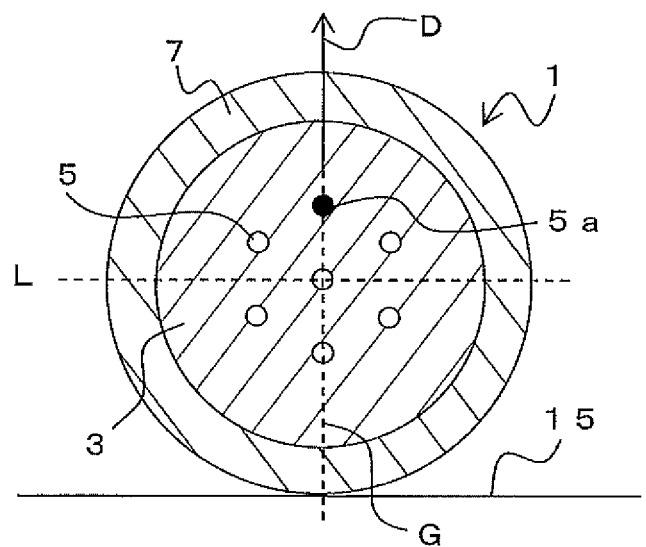
FIG. 4a is a cross sectional view of E section taken along the line F-F in FIG. 3 showing a light introducing core 5a being positioned at the top of a perpendicular line G of a bent portion 15 of the optical fiber.
Figure 4B:
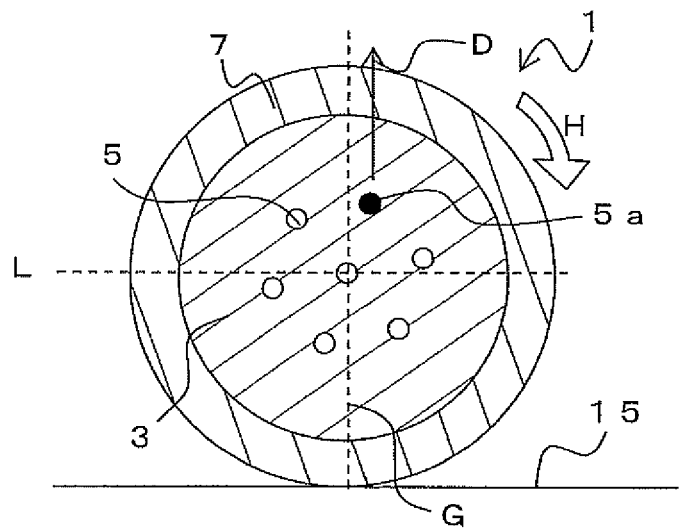
FIG. 4b is a cross sectional view of E section taken along the line F-F in FIG. 3 showing the light introducing core 5a being positioned at part which is shifted from the perpendicular line G.

FIG. 4a and FIG. 4b are cross sectional views of E section taken along the line F-F in FIG. 3. and show the different positions of a light introducing core 5a. The line G in the drawings is a center line of a cross section perpendicular to the longitudinal direction of the multi-core fiber 1 and is a line that is perpendicular to a roller surface of the optical fiber bending part 15. As mentioned above, although light can be introduced into all the cores 5, for simplification hereinafter, an example in which light is introduced into only the light introducing core 5a shown in the drawings will be described.

In FIG. 4a, the upper part above the line L (further away from the optical fiber bending part 15), which is a line that passes through the center core 5 and is parallel to the contacting surface with the optical fiber bending part 15 (i.e. neutral axis), is a tension region caused by bending deformation, and the lower part below the neutral axis L (in a direction of the optical fiber bending part 15) is a compressed region caused by bending deformation. That is, FIG. 4a shows a state in which the light introducing core 5a is on the line G and is at the furthermost position from the neutral axis L (the optical fiber bending part 15). Thus, the light introducing core 5a has the largest tension distortion in this state.

When a large distortion is given to the light introducing core 5a, light leaks accordingly (D in the drawing). This leaked light fluctuates corresponding to the amount of distortion, and if the amount of distortion increases, the amount of leaked light also increases. Thus, in the state of FIG. 4a, leaked light is at the maximum. The intensity of this leaked light is detected by the optical detector 23.

On the other hand, FIG. 4b is a drawing showing a state in which the light introducing core 5a is positioned at a part shifted from the perpendicular line G. That is, the multi-core fiber 1 is rotated slightly from the position shown in FIG. 4a with the center of the cross section as an axis of rotation (H in the drawing). Hereinafter, the rotation of the multi-core fiber 1 with the center axis thereof as an axis of rotation may be simply called as a rotation of the multi-core fiber 1. In this state, compared to the state shown in FIG. 4a, the light introducing core 5a is slightly closer to the neutral axis L. For this reason, the amount of distortion of the light introducing core 5a becomes smaller. As a result, the intensity of the leaked light D decreases.

The rotational direction of the multi-core fiber 1 can be detected with certainty by disposing a plurality of the optical detectors 23 at different positions in the circumferential direction of the multi-core fiber 1 respectively and detecting the leaked light from respective directions, for example.

By detecting the intensity of the light leaked from the light introducing core 5a using the optical detectors 23 in this way, it is possible to know that the light introducing core 5a is in the state shown in FIG. 4a when the intensity of the leaked light is maximum. Also, if the intensity of the leaked light decreases, it is possible to recognize that the multi-core fiber 1 is rotated.

Also, if light is introduced into all the cores, the rotation of the multi-core fiber 1 can still be detected by detecting the light leaked from the core. That is, to detect such a rotation, it is preferable to use an outermost core as the light introducing core 5a. In particular, when light is introduced into only a particular core, it is necessary to choose a core other than the center core of the multi-core fiber 1 as a particular core, and it is preferable to introduce light into the outermost core.

Figure 5A:
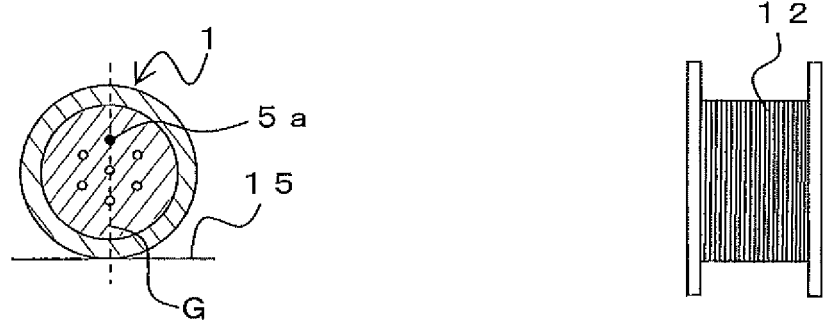
FIG. 5a is a drawing to show a position of the light introducing core 5a on a cross section of a multi-core fiber 1 and a tilt of a bobbin 12, in which the light introducing core 5a lies on the perpendicular line G.
Figure 5B:
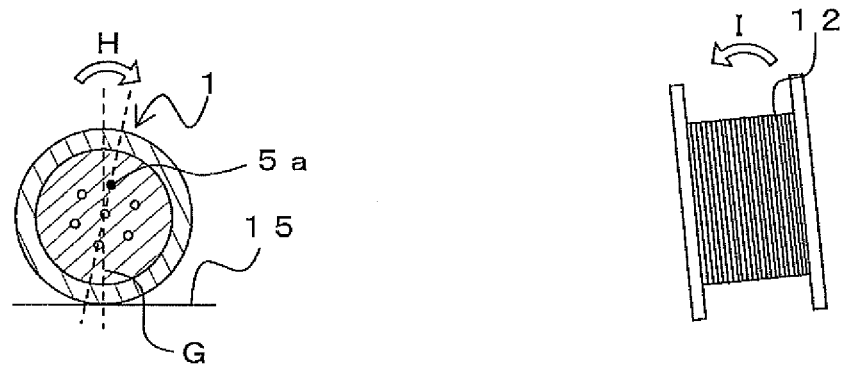
FIG. 5b is a drawing to show a position of the light introducing core 5a on a cross section of the multi-core fiber 1 and a tilt of the bobbin 12, in which the light introducing core 5a lies on a position shifted from the perpendicular line G.
Figure 5C:
FIG. 5c is a drawing to show a position of the light introducing core 5a on a cross section of the multi-core fiber 1 and a tilt of the bobbin 12, in which the light introducing core 5a lies on a position shifted from the perpendicular line G.

Next, a method for controlling the bobbin mounting part 11 (the bobbin 12) will be described. FIG. 5a to FIG. 5c are drawings to show the position of the light introducing core 5a on a cross section of the multi-core fiber 1 and the tilting of the bobbin 12. The left side of each of the drawings shows a cross sectional view of E section taken along F-F line in FIG. 3, and the right side of each of the drawings shows posture of the bobbin 12 viewed in C direction in FIG. 2.

FIG. 5a shows a standard state, in which the light introducing core 5a is on the line G and is at a position furthermost away from the optical fiber bending part 15. In this standard state, the bobbin 12 is maintained in an upright posture. Thus, the multi-core fiber 1 reeled out from the bobbin 12 has the light introducing core 5a positioned at the upper part.

On the other hand, when the intensity of the leaked light detected by the optical detector 23 changes so that the multi-core fiber 1 is found to be rotating, the bobbin controller 25 controls the posture of the bobbin 12. For example, as shown in FIG. 5(b), when it is recognized that the multi-core fiber 1 is rotated and the position of the core 5 is shifted to the right in the drawing (H in the drawing) with the center of the cross section as an axis, then the bobbin controller 25 tilts the rotational surface of the bobbin 12 in a direction opposite to the rotational direction of the multi-core fiber 1 (I direction in the drawing).

Similarly, as shown in FIG. 5(c), when it is recognized that the multi-core fiber 1 is rotated and the position of the core 5 is shifted to the left in the drawing (J in the drawing) with the center as an axis, then the bobbin controller 25 tilts the rotational surface of the bobbin 12 in a direction opposite to the rotational direction of the multi-core fiber 1 (K direction in the drawing). That is, the bobbin controller 25 and the bobbin 12 function as an optical fiber rotating part that rotates the multi-core fiber 1. As above, the optical fibers are rotated in the circumferential direction in such a manner that the amount of leaked light detected in the light detecting step is substantially constant (the optical-fiber rotating step).

The tilting angle of the bobbin 12 is determined according to the rotational angle of the multi-core fiber 1. For example, the rotational angle may be calculated from the intensity of light detected by the optical detector 23 and the bobbin 12 may be tilted for an angle to offset the rotational angle, or, alternatively, the bobbin 12 may be tilted until the intensity of the light leaked detected by the optical detector 23 comes to the maximum standard intensity.

At the resin applying part 19, the colored resin is applied continuously or intermittently along the longitudinal direction on a predetermined position of an outer surface of the resin coating of the multi-core fiber 1 in the circumferential direction (the resin coating step). Thus, controlling the particular core (the light introducing core 5a) to be always at a predetermined position in the circumferential direction on the cross section perpendicular to the longitudinal direction of the multi-core fiber 1 can make the positional relation between the colored portion 9 and the particular core substantially uniform over the longitudinal direction of the multi-core fiber 1.

For example, if the colored resin is applied to the multi-core fiber 1 from above, the colored portion 9 can be formed directly above the above-mentioned light introducing core 5a (the particular outermost core). That is, if the particular core is the outermost core that is closest to the periphery part of the cladding on the cross section perpendicular to the longitudinal direction of the multi-core fiber, the colored portion 9 can be formed on a position of the outer surface of the resin coating in the circumferential direction that is closest to the outermost core. This makes it possible to visually recognize the position of the particular core easily from the outer surface of the multi-core fiber 1.

Thus, since the position of the particular core of the multi-core fiber 1 can be easily recognized visually, alignment is easy when connecting the multi-core fiber 1 with other fibers or elements.

Moreover, as a method for connecting multi-core fibers 1 together, for example, the arrangements of the cores can be aligned by applying light from a side face of the multi-core fibers 1 and matching the light-and-shade patterns created according to the positions of the cores 5 with each other. Or, alternatively, the arrangements of the cores can be aligned by introducing light into a particular core or all cores of one of the multi-core fibers, detecting the light from cores of the other multi-core fiber, and then adjusting the positions until the detected light intensity is at maximum.

In either of the methods for connecting the multi-core fibers 1 together, the position of the particular core can be identified by the colored portion 9. Thus, the multi-core fibers are arranged to face each other with the positions of the colored portions 9 being matched first, and only a slight adjustment is to be done afterward. Thus, alignment is extremely easy.

As above, according to the present embodiment, the particular core 5 of the multi-core fiber 1 in the rotational direction can always be kept at a fixed position. Thus, the particular core 5 can always be kept at the fixed position on the cross section perpendicular to the longitudinal direction of the multi-core fiber 1, which is set to the resin applying part 19. Thus, the colored resin can always be applied to a fixed position in regard to the particular core 5. Thus, the positional relation between the position of the colored portion 9 and the position of the particular core 5 can be substantially uniform on a cross section perpendicular to the longitudinal direction of the multi-core fiber 1.

Thus, according to the presently described embodiments, the core arrangement can be easily identified from the outer surface of the resin coating of the multi-core fiber 1.

For this reason, when fusion splicing the particular cores together, for example, the core positions can be aligned easily and accurately by setting the multi-core fibers 1 with the matched positions of the colored portions 9 into a fusion splicer and performing a slight adjustment. Thus, a low-loss fusion splicing can be achieved easily.

Moreover, by selecting an outermost core as a light introducing core for detecting the rotation of the multi-core fiber 1, the rotation of the multi-core fiber 1 can be detected with more accuracy.

Moreover, by forming the colored portion 9 directly above the light introducing core as a particular core, the position of the particular core can be specified easily.

Moreover, if the same method is used for producing a connector, the multi-core fibers 1 can be inserted into a ferrule with the matched positions of the colored portions 9, which makes assembly easier. Also, when producing an optical fiber ribbon, the multi-core fibers 1 that are to be sent are arranged in one fixed direction using the positions of the colored portions 9 as a mark so that an optical fiber ribbon in which the cores 5 are arranged with a predetermined orientation on a cross section thereof can be obtained.

Figure 6:
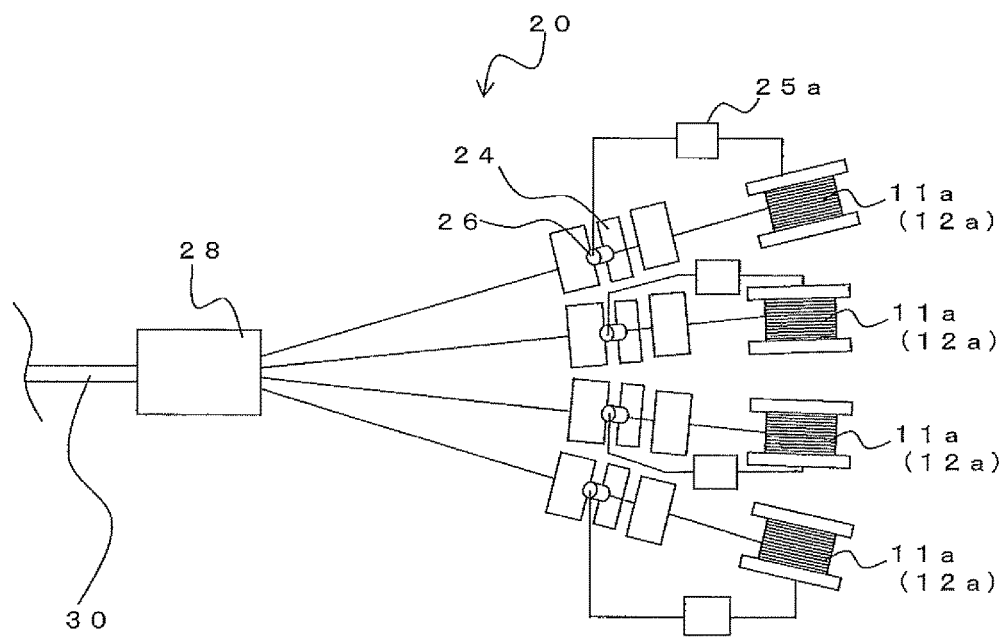
FIG. 6 is a drawing showing an optical fiber ribbon producing apparatus 20.

FIG. 6 is a plan view showing an optical fiber ribbon producing apparatus 20 for producing the optical fiber ribbon 30. The optical fiber ribbon producing apparatus 20 mainly includes bobbin mounting parts 11a, bobbin controllers 25a, guides 24, colored portion detectors 26, the ribbon resin coater 28, and so on. The number of the bobbin mounting parts 11a, the bobbin controllers 25a, the guides 24, and the colored portion detectors 26 disposed is equal to the number of the multi-core fibers 1 forming the optical fiber ribbon 30.

The bobbin 12a is disposed on the bobbin mounting part 11a. The multi-core fiber formed with the above-mentioned colored portion 9 is wound around the bobbin 12a, which reels out the multi-core fiber 1.

Each of the multi-core fibers 1 reeled out from the bobbins 12a is sent to the guides 24. The guide 24 is a roller that leads the multi-core fiber 1 to a predetermined position. For example, a V-shaped groove is provided on the guide 24 so as to lead the multi-core fiber 1 to always pass through a fixed position.

The colored portion detector 26 is disposed in the proximity of each of the guides 24. The colored portion detector 26 is a sensor that takes images of the surface of the multi-core fiber 1 and continuously detects the position of the colored portion 9. The colored portion detector 26 is, for example, a CCD camera. The position of the colored portion 9 detected by the colored portion detector 26 is sent to the respective bobbin controller 25a.

The bobbin controller 25a controls the posture of the bobbin 12a so that the colored portion 9 is always at a fixed position. In specific, when it is found out that the colored portion 9 is shifted from the center of the image of the multi-core fiber 1, the bobbin controller 25a tilts the bobbin 12a so as to move the colored portion 9 to the direction opposite to the shifting. In this way, the multi-core fiber 1 can be sent to the ribbon resin coater 28 with the colored portion 9 always oriented toward a fixed direction. The tilting of the bobbin 12a by the bobbin controller 25a is similar to the tilting of the bobbin 12 by the bobbin controller 25 described above.

The multi-core fibers 1 all aligned with the same orientation pass through the ribbon resin coater 28. At the ribbon resin coater 28, a plurality of the multi-core fibers 1 are aligned and ribbon resin coating is applied to the periphery part thereof. The ribbon resin coater 28 is, for example, an extruding machine including alignment dies or extrusion dies.

The ribbon resin coating applied by the ribbon resin coater 28 is cured by drying or UV radiation as necessary. The optical fiber ribbon 30, in which a plurality of the multi-core fibers 1 are integrated, is wound up by a winding apparatus whose drawing is omitted. As above, the optical fiber ribbon 30 is produced.

Figure 7A:
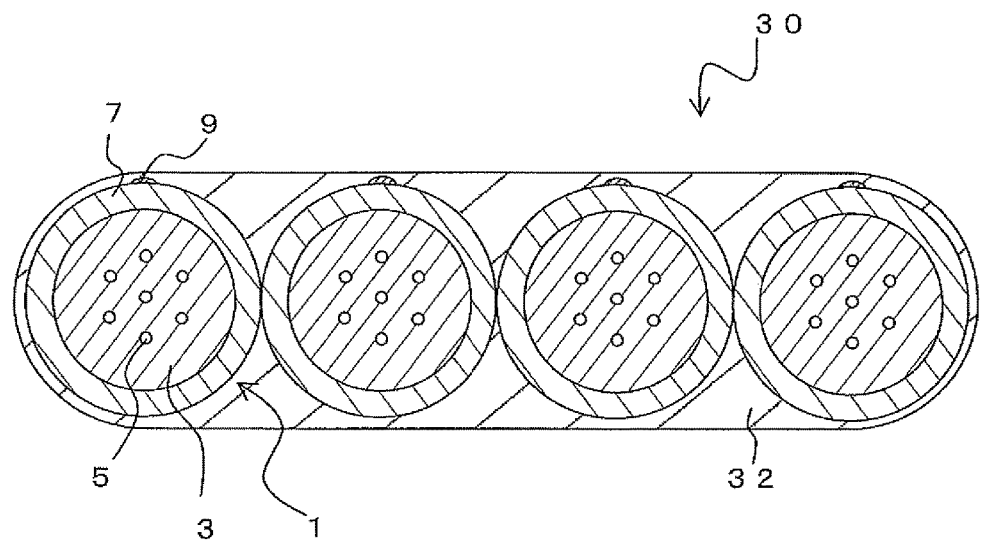
FIG. 7a is a cross sectional view showing an optical fiber ribbon 30.

FIG. 7a is a cross sectional view of the optical fiber ribbon 30. As mentioned above, the optical fiber ribbon 30 includes a plurality of the multi-core fibers 1 that are arranged in parallel and integrated by the ribbon resin coating 32. The multi-core fibers 1 are disposed in such a manner that, on the cross section perpendicular to the longitudinal direction of the optical fiber ribbon 30, the cores 5 of all the multi-core fibers 1 are all arranged with the same orientation over the longitudinal direction of the optical fiber ribbon 30. For example, in the example shown in the drawing, the multi-core fibers 1 are disposed in such a manner that every one of the center lines of each of the multi-core fibers 1 connecting three of the cores 5 is in the thickness direction of the optical fiber ribbon 30 (the vertical direction in the drawing). Also, in the optical fiber ribbon 30, the cores 5 are arranged substantially uniform over the entire length of the longitudinal direction of the optical fiber ribbon 30. That is, the arrangement of the cores 5 is always substantially uniform on any cross section of the optical fiber ribbon 30 in the longitudinal direction thereof.

Figure 7B:
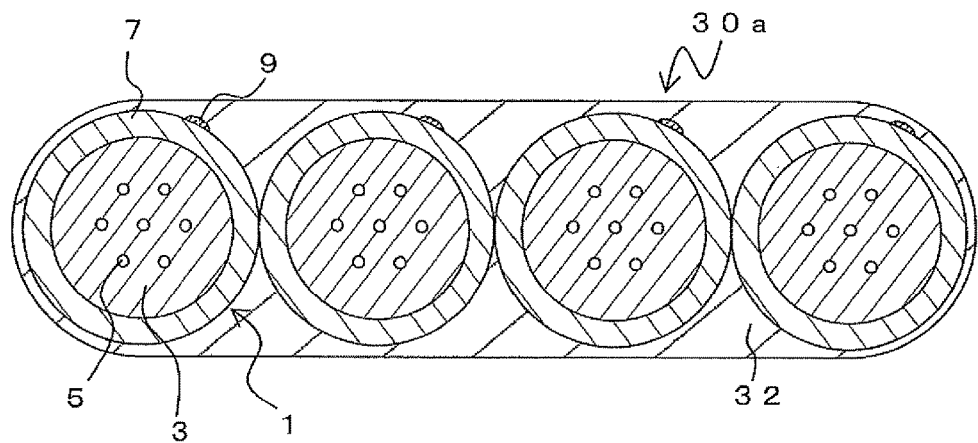

The arrangement of the cores 5 on the cross section perpendicular to the longitudinal direction of the optical fiber ribbon is not limited to the example shown in FIG. 7a. Alternatively, as in an optical fiber ribbon 30a shown in FIG. 7b, one of the center lines of each of the multi-core fiber 1d connecting the three cores 5 may all be rotated for a predetermined angle from the thickness direction of the optical fiber ribbon 30a (the vertical direction in the drawing). Or, the orientation of each of the multi-core fibers 1 may not all be the same. For example, the multi-core fibers 1 may be arranged in such a manner that the cores 5 of some of all the multi-core fibers 1 and the cores 5 of the other multi-core fibers 1 are positioned 90 degrees rotated from each other with the respective longitudinal direction of the multi-core fiber 1 as an axis of rotation. In either case, it is only required that the arrangement of the cores 5 is always substantially uniform on any cross section in the longitudinal direction of the optical fiber ribbon 30.

By recognizing the positions of the colored portions 9 with sensors or the like and then rotating and aligning the multi-core fibers 1, the optical fiber ribbon 30 in which the core arrangement is uniform over the longitudinal direction can be obtained.

Second Embodiment

Next, a second embodiment will be described. In the first embodiment, an example in which the light introducing part 13 is at an end of the multi-core fiber 1 was described. With this method, light can be introduced into a selected particular core only. However, another method can be used to introduce light into the multi-core fiber 1.

Figure 8A:
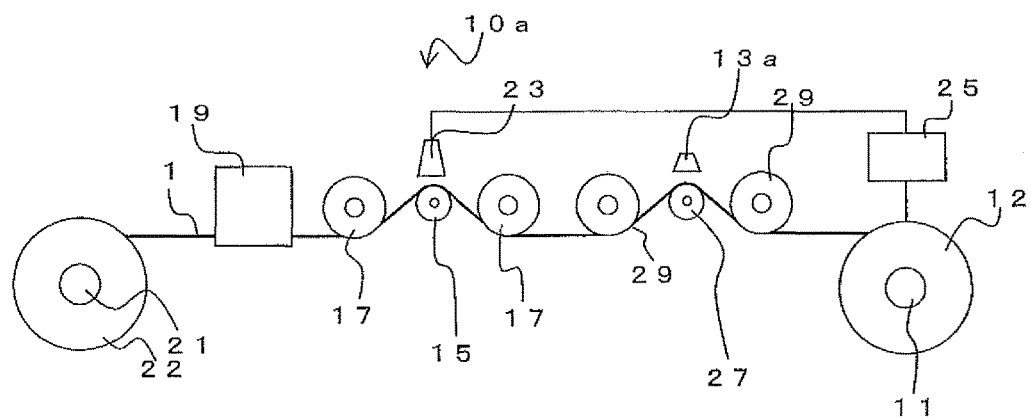

FIG. 8a is a drawing showing a colored resin applying apparatus 10a. In the descriptions hereinafter, the same notations will be used for the same compositions as in the colored resin applying apparatus 10 and redundant descriptions will be omitted. The colored resin applying apparatus 10a is approximately similar to the colored resin applying apparatus 10 except for a light introducing part 13a, which substitutes the light introducing part 13.

The light introducing part 13a includes a light-introducing bending portion 27 and a light source between a pair of guides 29. The light-introducing bending portion 27 is a roller that bends the multi-core fiber 1 contacting and passing the roller to have a predetermined curvature. The guides 29 are rollers for guiding the multi-core fiber 1 for a running route so that the multi-core fiber 1 contacts the light-introducing bending portion 27 for a predetermined range to be bent.

When the light source disposed in the proximity of the light-introducing bending portion 27 irradiates the multi-core fiber 1 passing over the light-introducing bending portion 27, light is introduced from the bent part into the cores inside the multi-core fiber 1. That is, light is introduced into the multi-core fiber 1 by a contrary principle of the light leaking from the optical fiber bending part 15. Some of the light introduced into the multi-core fiber 1 will be detected as the leaked light by the optical detector 23 at the optical fiber bending part 15.

As above, according to the second embodiment, the similar effects as in the first embodiment can also be obtained. At the light introducing part 13a, it is impossible to introduce light into only a particular core and thus light is introduced into a plurality of the cores or almost all the cores. However, even with this method, light can be introduced efficiently into the outermost core, which is furthermost away from the neutral axis, and the leaked light can be detected.

Third Embodiment

Figure 8B:
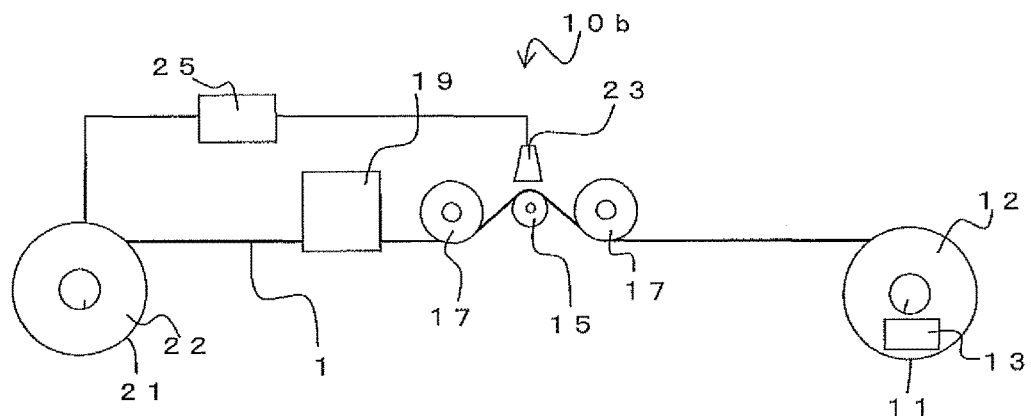
FIG. 8b is a drawing showing a colored resin applying apparatus 10b.

Next, a third embodiment will be described. FIG. 8b is a drawing showing a colored resin applying apparatus 10b. The colored resin applying apparatus 10b is approximately similar to the colored resin applying apparatus 10 except that the bobbin controller 25 controls the bobbin 22, not the bobbin 12.

In the colored resin applying apparatus 10b, like in the colored resin applying apparatus 10, the optical detector 23 detects intensity of light leaked from the optical fiber bending part 15 and the twisting of the multi-core fiber 1 in the rotational direction is detected. The bobbin controller 25 controls the posture of the bobbin 22 corresponding to the rotational direction and the rotation amount of the multi-core fiber 1 found out from the intensity of leaked light detected. More specifically, the bobbin controller 25 tilts a rotational surface of the bobbin 22. Thus, it is possible to always maintain the uniform positions of the cores 5 on the cross section perpendicular to the longitudinal direction of the multi-core fiber 1 that is sent to the resin coater 19.

An angle of rotation of the bobbin 22 is set according to an angle of rotation of the multi-core fiber 1. For example, the angle of rotation may be calculated from the light intensity detected by the optical detector 23 and the bobbin 22 may be tilted for an angle that offsets the angle of rotation.

As above, according to the third embodiment, the similar effects as in the first embodiment can be obtained. In addition, it is possible to control the position of the multi-core fiber 1 at a part further closer to the resin coater 19.

Fourth Embodiment

Figure 9A:
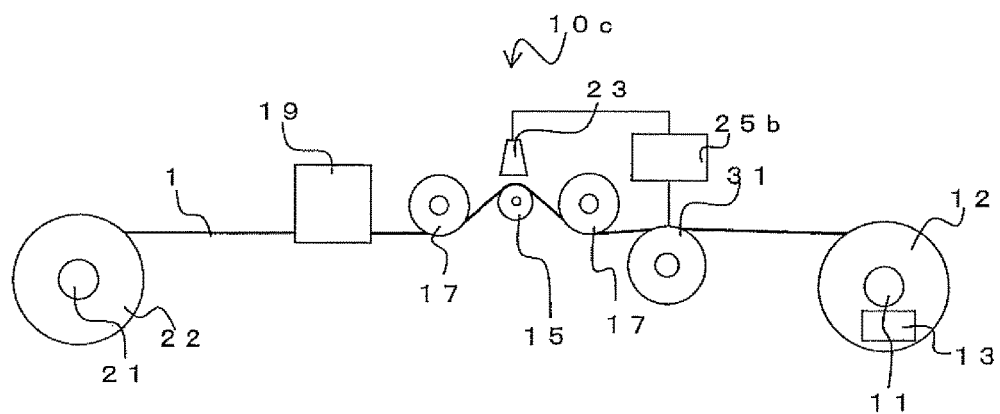
FIG. 9a is a drawing showing a colored resin applying apparatus 10c.

Next, a fourth embodiment will be described. FIG. 9a is a drawing showing a colored resin applying apparatus 10c. The colored resin applying apparatus 10c is approximately similar to the colored resin applying apparatus 10 except that it is provided with a fiber rotating part 31.

The fiber rotating part 31 is disposed between the bobbin 12 and the optical fiber bending part 15 (the guide 17). The fiber rotating part 31 is, for example, a roller. The multi-core fiber 1 contacts the fiber rotating part 31 for a predetermined range. Thus, predetermined friction force between the multi-core fiber 1 and the fiber rotating part 31 is created.

A rotation controller 25b controls the posture of the fiber rotating part 31 corresponding to the leaked light detected by the optical detector 23. More specifically, a rotational surface of the fiber rotating part 31 is tilted in the same manner as tilting the bobbin as mentioned above. Tilting the fiber rotating part 31 in this direction enables to add rotation to the multi-core fiber 1 contacting and passing the fiber rotating part 31. Thus, it is possible to always maintain the uniform positions of the cores 5 on the cross section perpendicular to the longitudinal direction of the multi-core fiber 1 that is sent to the resin coater 19.

As above, according to the fourth embodiment, the similar effects as in the first embodiment can be obtained. In addition, it is only necessary to control the posture of a roller which is smaller compared to bobbins such as the bobbin 12 or 22, so controlling is easier.

Fifth Embodiment

Figure 9B:
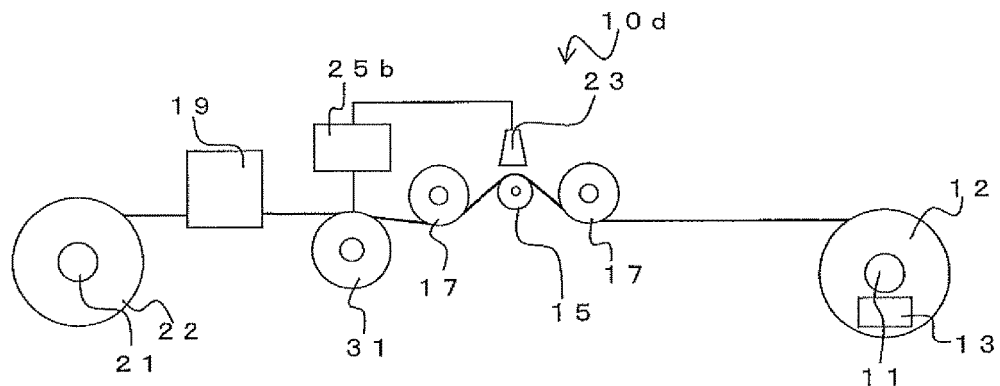
FIG. 9b is a drawing showing a colored resin applying apparatus 10d.

Next, a fifth embodiment will be described. FIG. 9b is a drawing showing a colored resin applying apparatus 10d. The colored resin applying apparatus 10d is approximately similar to the colored resin applying apparatus 10c except that the fiber rotating part 31 is provided at a different position.

In the colored resin applying apparatus 10d, the fiber rotating part 31 is disposed between the optical fiber bending part 15 (the guide 17) and the resin coater 19. In this case, an angle of rotation of the fiber rotating part 31 is set according to an angle of rotation of the multi-core fiber 1. For example, the angle of rotation may be calculated from the light intensity detected by the optical detector 23 and the fiber rotating part 31 may be tilted for an angle that offsets the angle of rotation.

As above, according to the fifth embodiment, the similar effects as in the fourth embodiment can be obtained. In addition, it is possible to control the position of the multi-core fiber 1 in the circumferential direction at a part further closer to the resin coater 19.

Sixth Embodiment

Figure 10:
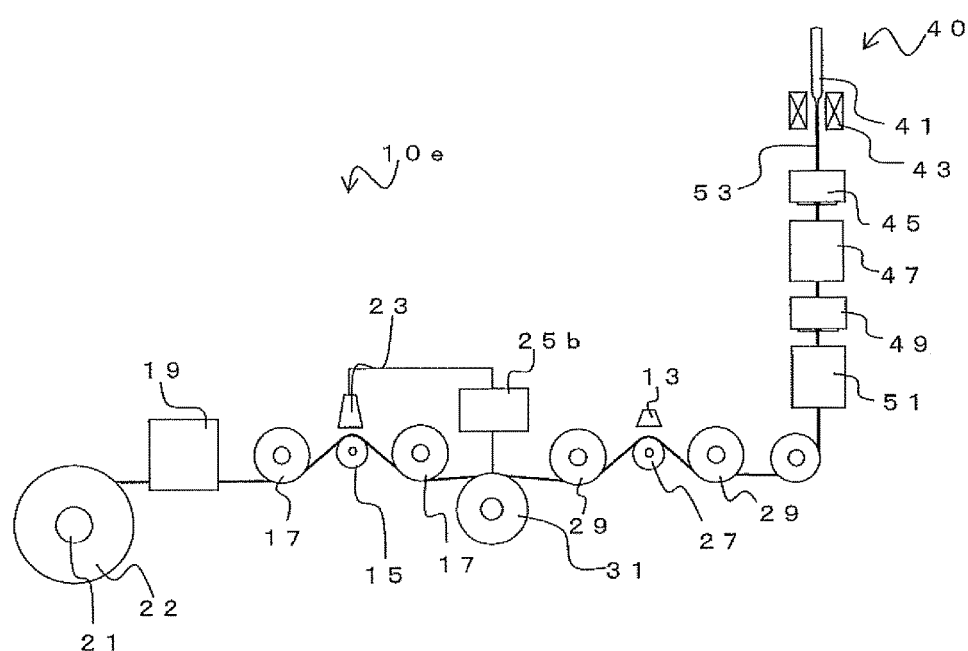
FIG. 10 is a drawing showing a colored resin applying apparatus 10e.

Next, a sixth embodiment will be described. FIG. 10 is a drawing showing a colored resin applying apparatus 10e. The colored resin applying apparatus 10e is approximately similar to the colored resin applying apparatus 10 except that the multi-core fiber 1 is not reeled out from the bobbin 12, and the colored resin applying apparatus 10e is disposed in succession with an optical fiber ribbon producing apparatus 40.

The optical fiber ribbon producing apparatus 40 includes a heater 43, resin coating dies 45 and 49, ultraviolet-irradiating device 47 and 51, and so on.

A multi-core fiber base material 41 is heated, melted, and extended by the heater 43 to obtain a glass fiber 53 having a predetermined diameter. Next, the glass fiber 53 is passed through the resin coating dies 45, which is provided with liquid resin that is heated up to a constant temperature, so that the liquid resin is applied to the periphery of the glass fiber 53. After that, the applied liquid resin is cured by the ultraviolet-irradiation device 47 to form a primary resin coating. Then, another layer of a secondary resin coating is further formed by the resin coating dies 49 and the ultraviolet-irradiation device 51. In this way, the resin coating 7 is formed and the multi-core fiber 1 is produced.

At this time, a colored material may be mixed into at least one of the primary and the secondary resin coatings to make the multi-core fiber 1a colored fiber.

The obtained multi-core fiber 1 is then sent to the colored resin applying apparatus 10e as it is. At the colored resin applying apparatus 10e, light is introduced from the light-introducing bending portion 27 and the leaked light is detected at the optical detector 23. The position of the multi-core fiber 1 in the rotational direction is then be grasped according to the obtained intensity of the leaked light and the fiber rotating part 31 rotates the multi-core fiber 1. This can keep the positions of the cores 5 always fixed on a cross section perpendicular to the longitudinal direction of the multi-core fiber 1 which is to be sent to the resin applying part 19.

The position of the fiber rotating part 31 may be on either a prior step side or a following step side of the optical fiber bending part 15. Also, the bobbin 22 may be rotated instead of the fiber rotating part 31.

As above, the same effects as in the first embodiment can be obtained from the sixth embodiment. The presently described embodiments can be carried out simultaneously with either of a drawing process, a rewinding process, a screening process, a coloring process, an overcoat process, or the like.

(Another Embodiment of the Multi-Core Fiber)

Figure 11A:
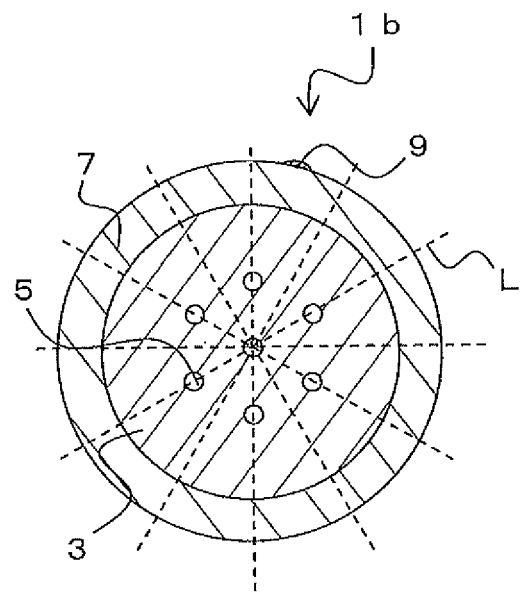
FIG. 11a is a drawing showing a multi-core fiber 1b.

The multi-core fiber that can be applied to the presently contemplated embodiments are not limited to the embodiments shown in FIG. 1a and FIG. 1b. For example, for a multi-core fiber 1b shown in FIG. 11a in which a plurality of cores are disposed so as to have symmetry on a cross section perpendicular to the longitudinal direction, the colored portion 9 is preferably formed at a position that is shifted from a selected symmetric axis L from a viewpoint of the core identification.

Thereby, it is possible to make the distance from each of a plurality of the cores to the colored portion 9 all different from each other so that a particular direction in a circumferential direction of the cladding can be identified. This enables to distinguish between both ends of the multi-core fiber 1b and prevents the multi-core fiber 1b from being connected in a wrong direction.

Figure 11B:
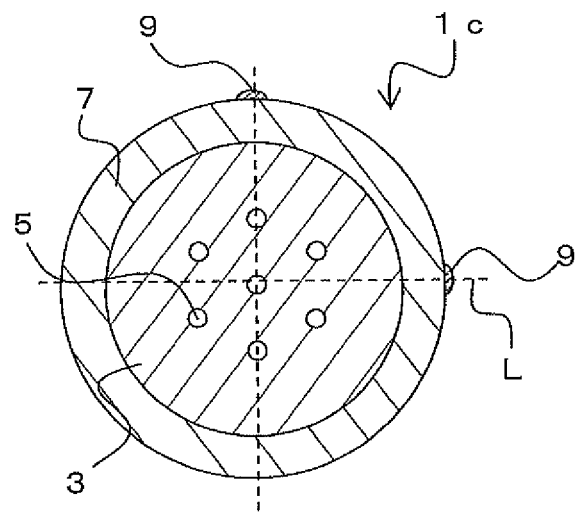
FIG. 11b is a drawing showing a multi-core fiber 1c.

Alternatively, the colored portions 9 may be disposed at a plurality of locations as in a multi-core fiber 1c shown in FIG. 11b. In this case too, if a plurality of cores are disposed so as to have symmetry, the colored portions 9 are preferably formed at positions that are shifted from the selected symmetric axis L from a viewpoint of the core identification. This enables to identify cores with more certainty. Also, different color may be used for the every colored portion 9.

Figure 12A:
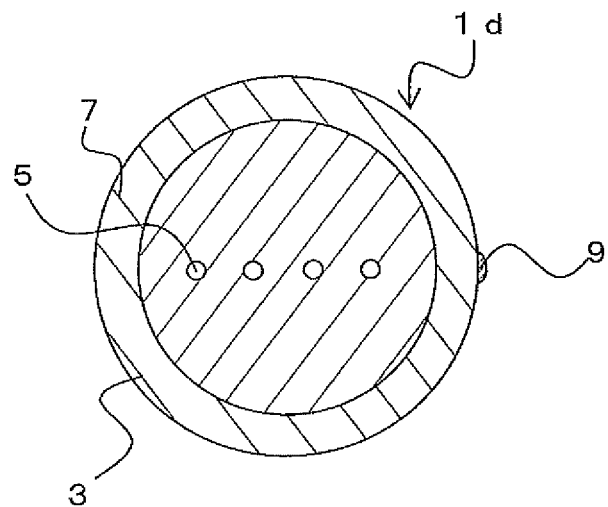
FIG. 12a is a drawing showing a multi-core fiber 1d.

Also, the arrangement of cores of multi-core fibers, which is subject to the contemplated embodiments, is not limited to the above-mentioned examples. For example, as shown in FIG. 12a, the contemplated embodiments can be applied to a multi-core fiber 1d in which the cores 5 are arranged in a row. In this case, the colored portion 9 may be formed at a position in the circumferential direction that is closest to the outermost core, which is the closest to the outer periphery part, on a cross section perpendicular to the longitudinal direction, or may be disposed at a position perpendicular thereto. Also, the colored portions 9 may be disposed at a plurality of the locations and may be disposed at positions that are shifted from a selected axis of symmetry.

Figure 12B:
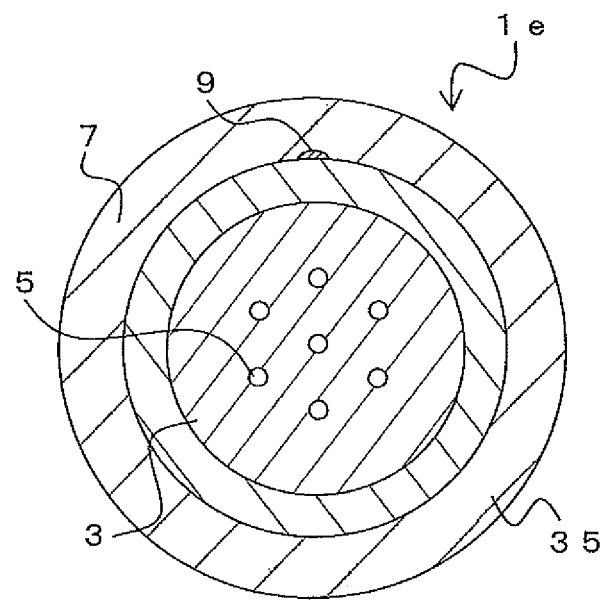
FIG. 12b is a drawing showing a multi-core fiber 1e.

As shown in FIG. 12b, the presently contemplated embodiments can also be applied to a multi-core fiber 1e that has an overcoat resin 35. In this case, the colored portion 9 is formed on a periphery of the resin coating 7 and the overcoat resin 35 may coat thereon. In this case, the overcoat resin 35 is preferably transparent. If the overcoat resin 35 is not transparent, the same effects can still be obtained by removing the overcoat resin 35 in the proximity of the connection part so that the position of the colored portion can be identified. In this case too, the colored portion 9 may be formed at a position in the circumferential direction that is closest to the outermost core, which is the closest to the outer periphery part, on a cross section perpendicular to the longitudinal direction, or may be disposed at a position perpendicular thereto. Also, the colored portions 9 may be disposed at a plurality of the locations and may be disposed at positions that are shifted from a selected axis of symmetry.

Also, the presently contemplated embodiments can be applied to a multi-core fiber having an asymmetrical arrangement of the cores 5, whose drawing is omitted. In this case, the multi-core fiber will never be connected in a wrong direction even if the colored portion 9 is disposed at only one location.

Also, the colored portion is not limited to a visibly identifiable portion but may be something that can be identified by a detector or the like.

Although examples in which optical fibers are multi-core fibers are described above, the contemplated embodiments are not limited thereto. Other than multi-core fibers, it is also applicable to optical fibers of which the form of a cross section perpendicular to the longitudinal direction thereof has an orientation in a rotational direction with the longitudinal direction as an axis.

For example, it is even applicable to a single-core optical fiber in which a core is positioned eccentrically from the center of the optical fiber. Also, the contemplated embodiments can also be applied to a polarization-maintaining fiber, a flat core fiber, or to an eccentric core fiber provided with a marker in addition to signal light transmission cores. In this case, light is introduced into the marker to identify the rotational position of the optical fiber using the above-mentioned method and then the colored resin is applied. Since the marker of the optical fiber is required to maintain the light for only a predetermined length and is not used for transmitting signal light, it is unnecessary to consider the optical transmission characteristics thereof. Thus, the marker 8 can be made leaky of light compared to the cores and this is particularly ideal for the present embodiment.

As above, according to the present embodiment, an optical fiber in which the relation between the position of the colored portion and the position of the core is substantially uniform over the longitudinal direction on a cross section perpendicular to the longitudinal direction of the optical fiber can be obtained.

Although the embodiments have been described referring to the attached drawings, the technical scope of the claims is not limited to the embodiments described above. It is obvious that persons skilled in the art can think out various examples of changes or modifications within the scope of the technical idea disclosed in the claims, and it will be understood that they naturally belong to the technical scope of the disclosure.

For example, needless to say, each of the embodiments can be combined with each other.

What is claimed is:

1. A method of producing an optical fiber, the optical fiber comprising:
    a core;
    a cladding that is formed on a periphery of the core and has a refractive index lower than that of the core;
    a resin coating that is formed on a periphery of the cladding; and
    a colored portion that is provided on a part of an outer surface of the resin coating in a circumferential direction thereof, the method including:
    a light introducing step which introduces light into a core of the fiber;
    a light leaking step which leaks the light introduced into the core to the outside of the optical fiber;
    a light detecting step which detects the light leaked in the light leaking step;
    an optical-fiber rotating step which rotates the optical fiber in a circumferential direction thereof so as to maintain the leaked light detected in the light detecting step to be substantially constant; and
    a resin applying step which applies a colored resin on a part of an outer surface of the resin coating in a circumferential direction thereof so that a positional relation between a position of the colored resin and a position of the core is substantially uniform over the longitudinal direction on a cross section perpendicular to the longitudinal direction of the optical fiber.

2. The method of producing an optical fiber according to claim 1, wherein
    the optical fiber is a multi-core fiber including a plurality of cores; and
    the colored portion is applied to a part of the outer surface of the resin coating in the circumferential direction in the resin applying step so that a positional relation between a position of the colored portion and a position of a particular core, which is one of the plurality of the cores, is substantially uniform over the longitudinal direction on a cross section of the multi-core fiber perpendicular to the longitudinal direction.

3. The method of producing an optical fiber according to claim 1, wherein
    the light is introduced from a bent portion of the bent optical fiber in the light introducing step.

4. The method of producing an optical fiber according to claim 1, wherein:
    the light is introduced from an end of the optical fiber in the light introducing step.

5. The method of producing an optical fiber according to claim 1, wherein:
    the optical-fiber rotating step rotates the optical fiber in its circumferential direction by tilting a rotational surface of a bobbin that winds up the optical fiber or a bobbin that reels out the optical fiber.

6. The method of producing an optical fiber according to claim 1, wherein:
    the optical-fiber rotating step rotates the optical fiber in its circumferential direction by tilting a rotational surface of a roller which is disposed either in front or rear of a detector that detects leak of the light in the light detecting step.

* * * * *